United States Patent
Kim (10) Patent No.: US 8,795,120 B2
(45) Date of Patent: Aug. 5, 2014

(54) DRIVE UNIT FOR ELECTRIC BICYCLE

(71) Applicant: Mando Corporation, Pyeongtaek-si (KR)

(72) Inventor: Il Yong Kim, Suwon-si (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 13/682,482

(22) Filed: Nov. 20, 2012

(65) Prior Publication Data

US 2014/0080651 A1   Mar. 20, 2014

(30) Foreign Application Priority Data

Sep. 19, 2012  (KR) .......................... 10-2012-104245

(51) Int. Cl.
*B60K 1/04* (2006.01)

(52) U.S. Cl.
USPC ............... 475/149; 475/331; 475/337; 475/8; 180/65.6; 180/65.51; 180/65.7

(58) Field of Classification Search
USPC ........................................................ 475/149
See application file for complete search history.

(56) References Cited

U.S. PATENT DOCUMENTS

| | | | | |
|---|---|---|---|---|
| 6,296,072 | B1 * | 10/2001 | Turner | 180/220 |
| 8,100,208 | B2 * | 1/2012 | Jordan | 180/65.51 |
| 2005/0176542 | A1 * | 8/2005 | Lo | 475/5 |
| 2008/0070736 | A1 * | 3/2008 | Yoshino et al. | 475/149 |
| 2011/0034283 | A1 * | 2/2011 | Tsai et al. | 475/149 |
| 2012/0012412 | A1 * | 1/2012 | Moeller et al. | 180/206.2 |
| 2012/0083375 | A1 * | 4/2012 | Lo | 475/149 |

FOREIGN PATENT DOCUMENTS

| | | |
|---|---|---|
| DE | 3831627 A1 | 3/1990 |
| DE | 102011088258 A1 | 6/2012 |
| DE | 202012101844 U1 | 7/2012 |
| EP | 0980821 A2 | 2/2000 |

OTHER PUBLICATIONS

Extended European Search Report issued in Application No. 12190265.4 mailed Dec. 20, 2013.

* cited by examiner

*Primary Examiner* — Sherry Estremsky
*Assistant Examiner* — Lillian Nguyen
(74) *Attorney, Agent, or Firm* — McDermott Will & Emery LLP (57) ABSTRACT

A drive unit for an electric bicycle, the drive unit including a motor configured to generate a rotary force to drive a wheel of the electric bicycle, a reduction gear unit provided with a plurality of gears to decelerate a rotary force generated from the motor, and a ring gear configured to output the rotary force which is decelerated by the reduction gear, wherein a rib is formed on at least one of two lateral sides of the ring gear.

6 Claims, 6 Drawing Sheets

DRIVE UNIT FOR ELECTRIC BICYCLE

CROSS-REFERENCE TO RELATED APPLICATION

This application claims the benefit of Korean Patent Application No. 2012-0104245, filed on Sep. 19, 2012 in the Korean Intellectual Property Office, the disclosure of which is incorporated herein by reference.

BACKGROUND

1. Field

Embodiments of the present disclosure relate to an electric bicycle, and more particularly, to a drive unit for an electric bicycle having an improved structure to transmit a driving force to a wheel through a motor.

2. Description of the Related Art

In general, a bicycle is a means of transportation for a short distance, and widely used for enhancement of heath or as a hobby.

In recent years, an electric bicycle having a motor has been developed to be driven by a driving force of the motor so as to travel in long distance, or reduce physical exhaustion.

A motor installed on the electric bicycle to provide a driving force is used while being installed on a front wheel or a rear wheel (hereinafter, referred to as a wheel in common) of the electric bicycle, to rotate the wheel, thereby enabling the running of the electric bicycle. In order to transfer a rotary force of the motor to the wheel, a drive unit is constituted by including a motor, serving as a driving source, and a decelerator to reduce the rotary force of the motor. Numerous studies and researches have been conducted on a drive unit capable of stably transfer the driving force.

SUMMARY

Therefore, it is an aspect of the present disclosure to provide a drive unit for an electric bicycle having an improved structure thereof as related to transfer a driving force of driving a wheel.

Additional aspects of the disclosure will be set forth in part in the description which follows and, in part, will be obvious from the description, or may be learned by practice of the disclosure.

In accordance with one aspect of the present disclosure, a drive unit for an electric bicycle, the drive unit includes a motor, a reduction gear unit, and a ring gear. The motor may be configured to generate a rotary force to drive a wheel of the electric bicycle. The reduction gear unit may be provided with a plurality of gears to decelerate a rotary force generated from the motor. The ring gear may be configured to output the rotary force which is decelerated by the reduction gear. A rib may be formed on at least one of two lateral sides of the ring gear.

The rib may be integrally formed with an entire surface of the at least one of two lateral sides of the ring gear.

Each of the ring gear and the rib may be provided at an outer circumferential surface thereof with a plurality of protrusions protruding outward while being spaced apart from each other.

The drive unit may further include a motor housing installed on the wheel of the electric bicycle to accommodate the motor and the reduction gear unit, and the ring gear may be installed on the motor housing.

The motor housing may be provided with a coupling groove matched in shape to the protrusion such that the protrusion is coupled to the coupling groove.

The reduction gear unit may include a first planet gear assembly and a second planet gear assembly, each of which has a sun gear rotated by receiving a rotary force, a plurality of planet gears disposed around the sun gear and engaged with the sun gear, a carrier connected to a center shaft of each of the plurality of planet gears, and a ring gear to surround the plurality of planet gears while being engaged with the plurality of planet gears. The first planet gear assembly and the second planet gear assembly may be sequentially disposed such that a final output gear outputs a rotary force, which is decelerated from the second planet gear assembly, through the ring gear.

The motor may be provided with a rotor, which has an accommodation space formed at a center thereof, and a stator installed to surround the rotor while being spaced apart from the rotor by a predetermined interval. The first planet gear assembly may be disposed in the accommodation space so as to be connected to the rotor, and the second planet gear assembly may be disposed at an outside the motor.

As described above, a structure of the motor and the reduction gear unit is improved, so that the drive unit is provided in a stable and compact structure.

In addition, an output of the motor having a rotary force with a reduced speed is directly transmitted to the motor housing to rotate the motor housing, and since the motor housing is installed on the wheel, the structure of driving the wheel is simplified, thereby improving the assembly efficiency of the drive unit.

In addition, the ring gear coupled to the motor housing, which rotates together with the wheel, and configured to output a rotary force with a reduced speed is provided with a rib to improve the rigidity and enables the rotary force to be stably transferred while preventing the ring gear from being damaged during a heat treatment processing of the ring gear.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

The present disclosure is characterized in a wheel assembly for an electric bicycle, a manufacturing method thereof, a motor housing integrated-type spoke provided on a wheel and a manufacturing method thereof. Prior to the description of the characteristics of the present disclosure, an electric bicycle adopted with the present disclosure will be described in brief.

Figure 1:
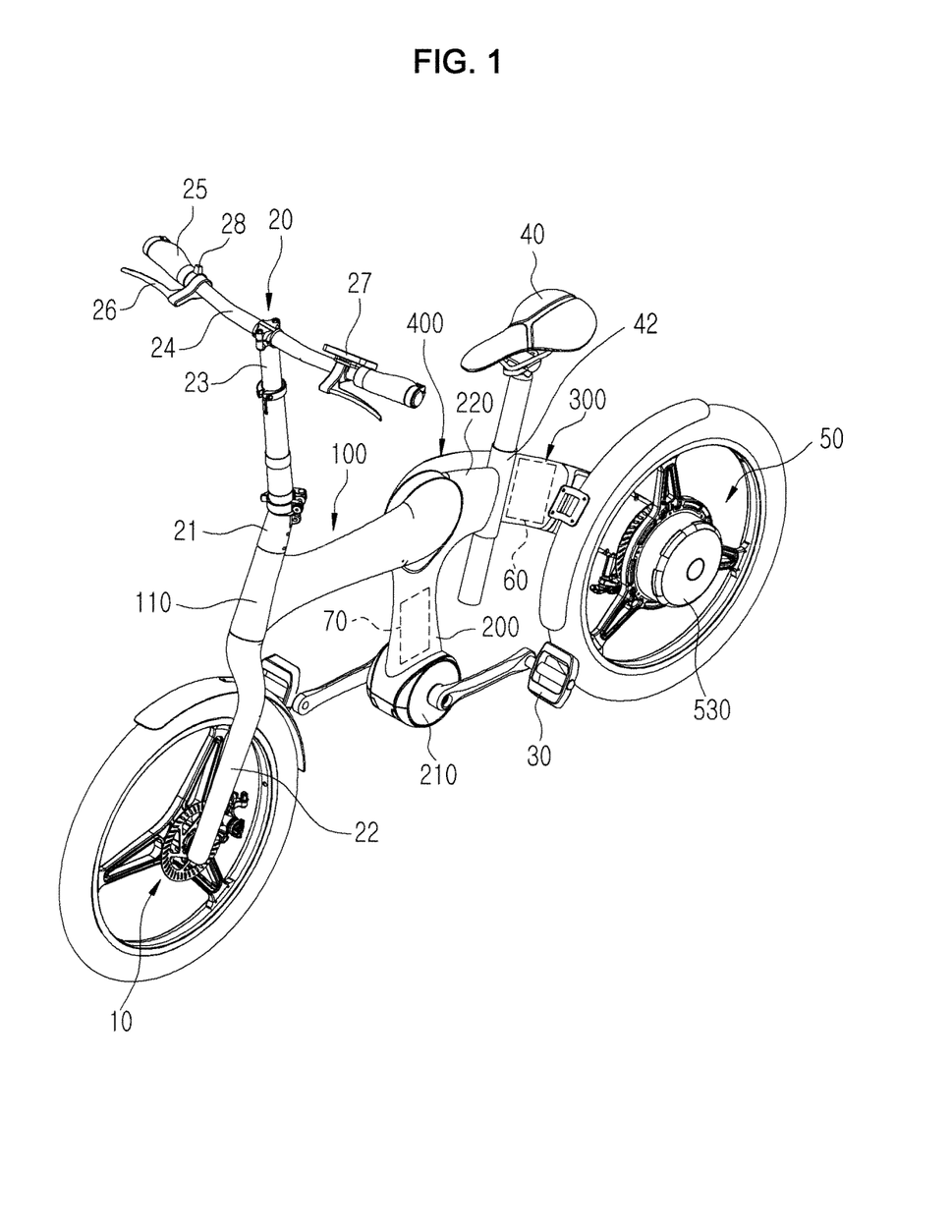
FIG. 1 is a perspective view illustrating an electric bicycle in accordance with one embodiment of the preset disclosure.
Figure 2:
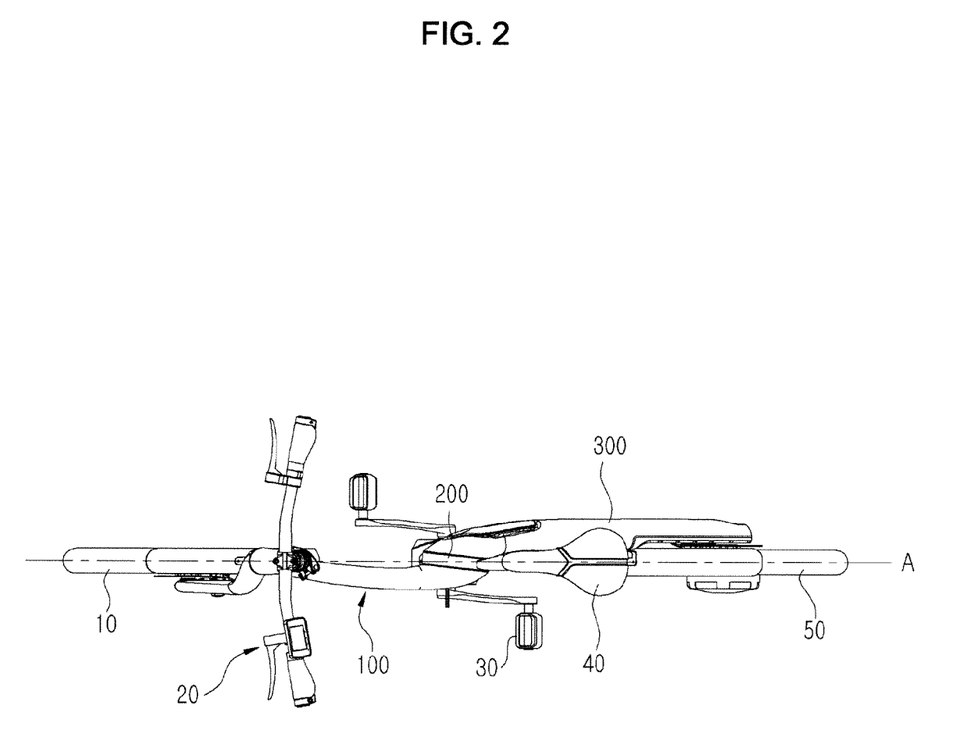
FIG. 2 is a plan view of FIG. 1
Figure 3:
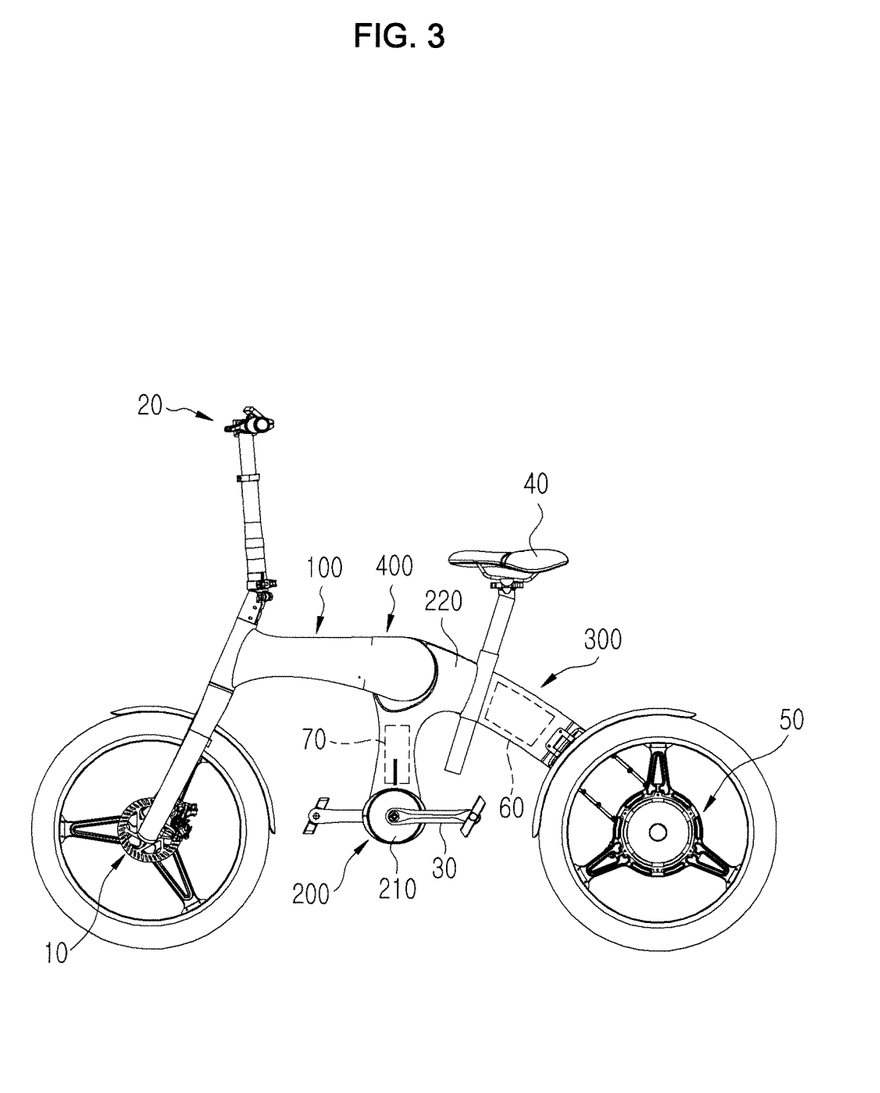
FIG. 3 is a side view of FIG. 1.

FIG. 1 is a perspective view illustrating an electric bicycle in accordance with one embodiment of the preset disclosure, FIG. 2 is a plan view of FIG. 1, and FIG. 3 is a side view of FIG. 1.

Referring to FIGS. 1 to 3, an electric bicycle in accordance with an embodiment of the present disclosure includes a front frame 100 provided with a front wheel 10 and a handle portion 20, a center frame 200 provided with a pedal 30 and a saddle 40, and a rear frame 300 provided with a rear wheel 50. The front frame 100, the center frame 200 and the rear frame 300 are coupled to one another so as to be rotated on a hinge coupling portion 400 of the center frame 200.

The front frame 100 is provided in the form of a bar having an interior space. A handle tube 110 is provided at one end of the front frame 100, and the center frame 200 is rotatably coupled to the other end of the front frame 100. The handle tube 110 is provided in hollowness such that a handle stem 21 is rotatably coupled to the handle tube 110. The handle stem 21 is provided with a front wheel fixing frame 22 at a lower side of the handle tube 110, and provided with a handle fixing frame 23 at an upper side of the handle tube 110. The front wheel fixing frame 22 is provided by partially bending the handle stem 21 from a center to a lateral side such the front wheel 10 is disposed in the same line ('A' of FIG. 2) with the rear wheel 50. The handle fixing frame 23 supports the center of a handle bar 24 that is provided in the form of a bar. Each end portion of the handle bar 24 is provided with a grip 25 and a brake lever 26 for braking the front wheel 10 and the rear wheel 50. A display apparatus 27 is detachably installed at one side of the handle bar 24 to display information of the electric bicycle, such as speed change or battery of the electric bicycle, and a lever 28 is installed at the other side of the handle bar 24 for speed change.

The center frame 200 has an interior space and is provided in the form of a bar. The pedal 30 is provided at one end of the center frame 200, and the front frame 100 and the rear frame 300 are rotatably coupled to the other end of the center frame 200. The one pair of pedals 30 is provided so as to be rotated on a pedal coupling portion 210 provided on the center frame 200. At an inside of the pedal coupling portion 210, a generator (not shown) is provided to convert a rotary power of the pedal 30 into an electric energy, and the electric energy charges a battery 60 electrically connected to the generator. At the interior space of the center frame 200, an engine control unit (ECU) 70 is provided for the electrical connection and control between the generator and other electronic components.

In addition, the center frame 200 may include a saddle frame 220 on which the saddle 40 is installed. The saddle frame 220 is provided at a rear side thereof with a saddle tube 42 on which the saddle 40 is installed. A saddle rod (not shown) is coupled to the saddle tube 42 to adjust the height of the saddle 40.

The rear frame 300 has an interior space and provided in the form of a bar. The rear wheel 50 is rotatably installed at one end of the rear frame 300, and the center frame 200 is rotatably installed at the other end of the rear frame 300.

At the interior space of the rear frame 300, the battery 60 and a battery management system (not shown) are provided that are electrically connected to the ECU 70 provided on the center frame 200. The motor installed on the rear frame 300 is disposed on the rear wheel 50. The motor (not shown) is accommodated in a motor housing 530 that is installed on the rear wheel 50, and configured to rotate the rear wheel 50 by receiving a driving force from the battery 60 according to the control of the ECU 70.

As described above, the front frame 100, the center frame 200 and the rear frame 300 are provided in a foldable structure that enables the front frame 100 and the rear frame 300 are rotated on the center frame 200 by the hinge coupling portion 400.

Hereinafter, a drive unit for an electric bicycle in accordance with the present disclosure will be described in detail. In the drawing, the drive unit is illustrated as being installed on the rear wheel 50 to drive the wheel. However, the present disclosure is not limited thereto, the drive unit may be installed on the front wheel. The following description will be made in relation that the drive unit is provided on the rear wheel.

Figure 4:
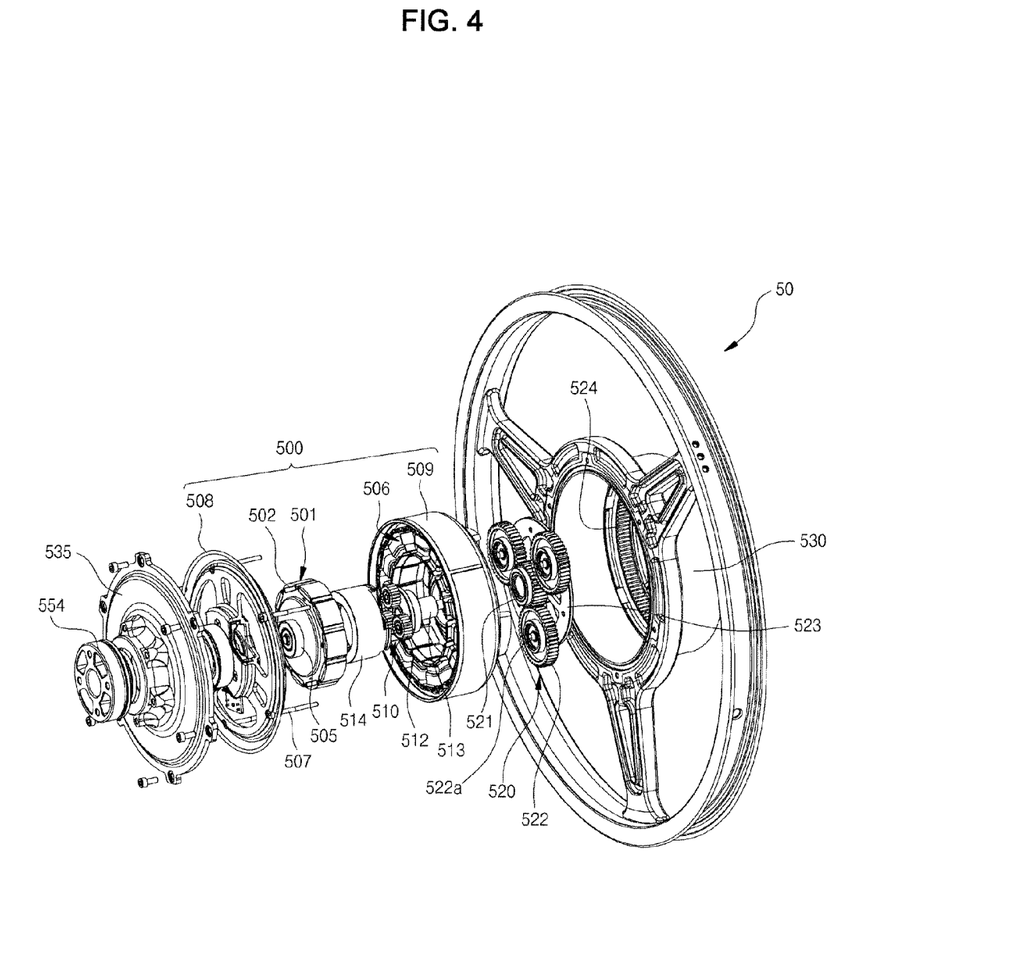
FIG. 4 is an exploded perspective view illustrating a drive unit of the electric bicycle in accordance with the one embodiment of the preset disclosure.
Figure 5:
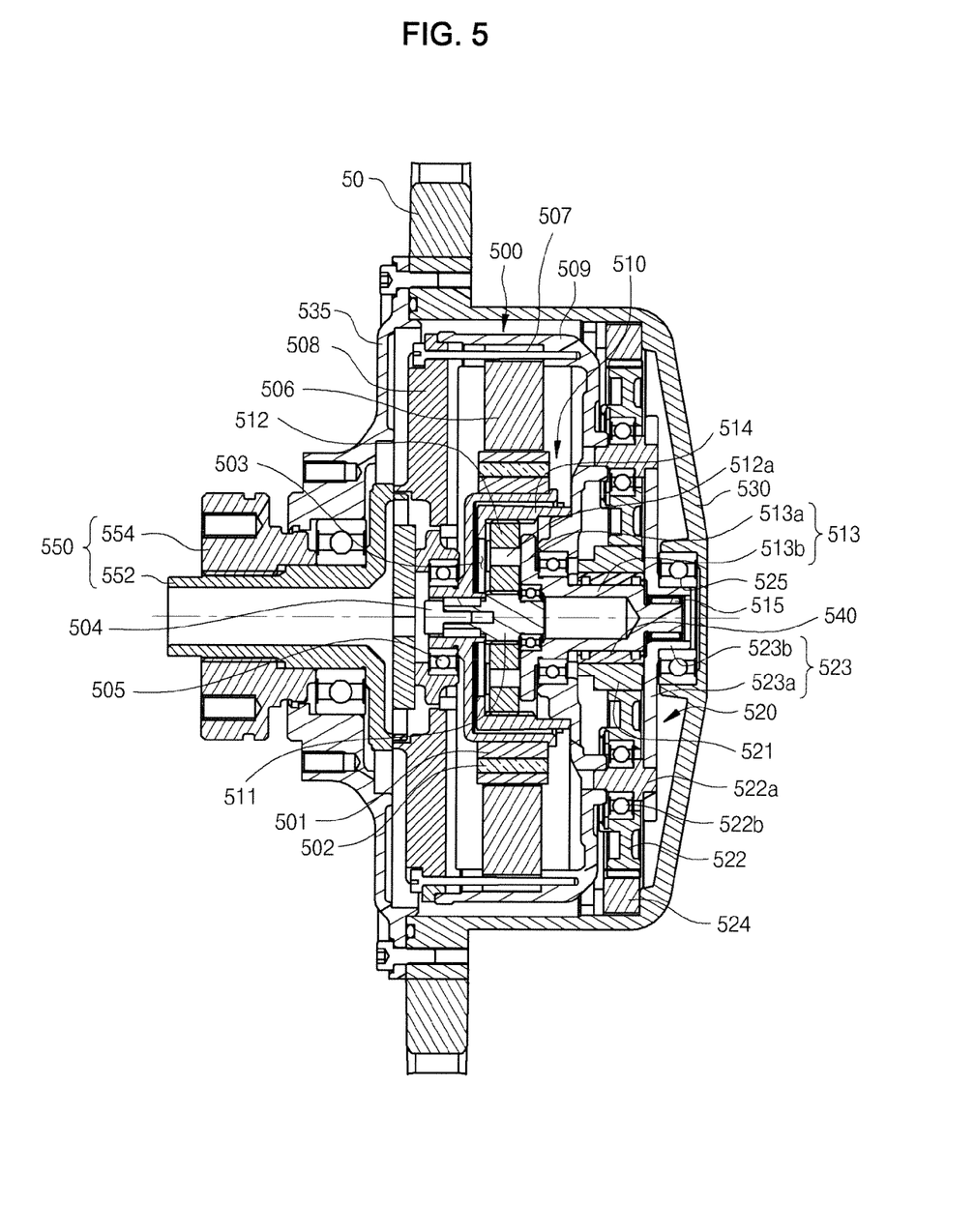
FIG. 5 is an assembled perspective view of FIG. 4.
Figure 6:
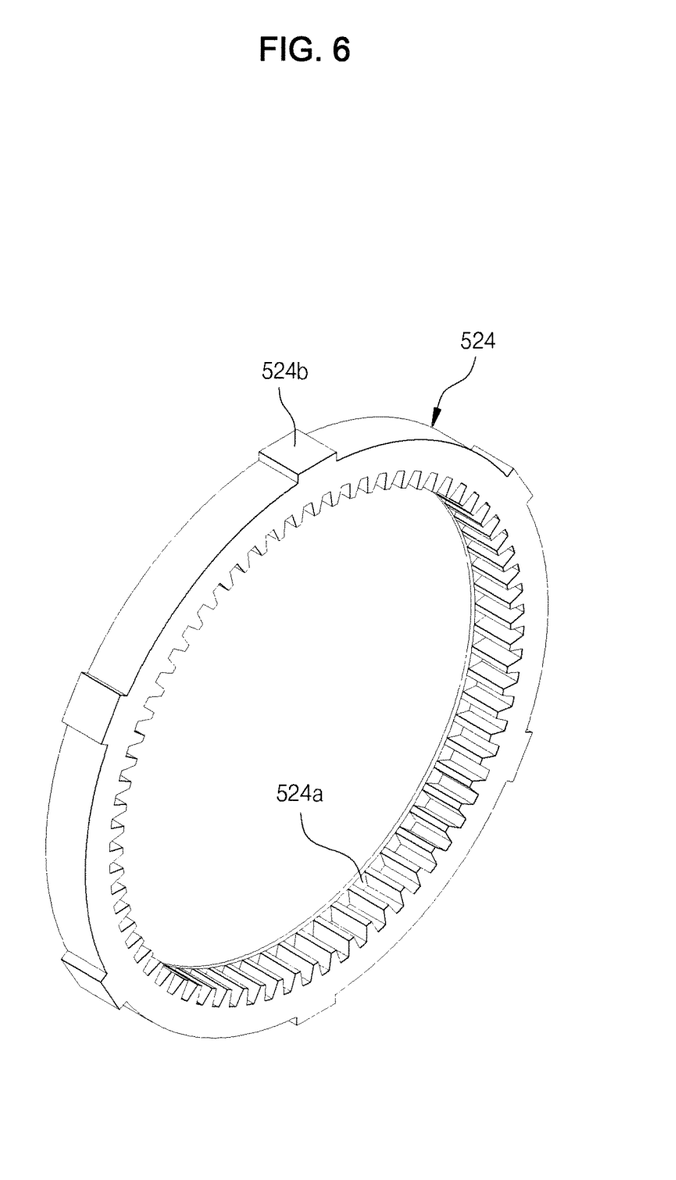
FIG. 6 is a perspective view illustrating a ring gear provided on a drive unit for the electric bicycle in accordance with the one embodiment of the preset disclosure.

FIG. 4 is an exploded perspective view illustrating a drive unit of the electric bicycle in accordance with the one embodiment of the preset disclosure, FIG. 5 is an assembled perspective view of FIG. 4, and FIG. 6 is a perspective view illustrating a ring gear provided on a drive unit for the electric bicycle in accordance with the one embodiment of the preset disclosure.

Referring to FIGS. 4 and 5, the drive unit includes a motor 500, which is provided with a rotor 501 and a stator 506 to generate a rotary force to drive the wheel 50, a reduction gear unit to decelerate the rotary force of the motor 500, and a motor housing 530 to accommodate the reduction gear unit and the motor 500. The motor housing 530 is installed on the wheel 50 so as to be rotated together with the wheel 50 by the driving force generated from the motor 500.

The motor 500 includes a front side housing 508 and a rear side housing 509 that are assembled to each other through a bolt 507, and the rotor 501 and the stator 506 are provided in an interior space formed between the front side housing 508 and the rear side housing 509 assembled to each other.

The rotor 501 is provided in the shape of a ring, and has a plurality of magnets 502 installed thereto while being spaced apart from each other along an outer circumferential surface of the rotor 501. In addition, the rotor 501 is provided at a center thereof with a predetermined accommodation space 503 where a first planet gear assembly 510 of the reduction gear unit that is to be described later is disposed. In addition, a rotating shaft 504 rotating together with the rotor 501 is provided at one of two sides of the rotor 501. The rotating shaft 504 serves as an input shaft to transfer a rotary force that is generated from the rotor 501. As illustrated in the drawings, the rotating shaft 504 is provided at a side of the rotor 501 facing the front side housing 508, and a bearing 505 is installed on the rotating shaft 504 so as to be rotatably supported by the front side housing 508. Accordingly, the rotating shaft 504 is easily rotated together with the rotor 501.

The stator 506 is formed to surround the rotor 501 while being spaced apart from the rotor 501 by a predetermined interval. The stator 506 has a coil (not shown) wound thereon, and is installed at an inner circumferential surface of the rear side housing 509. If a power is applied to the coil, an attractive force and a repulsive force act between the magnet 502 and the coil, thereby rotating the rotor 501.

Meanwhile, a fixing unit 550 is installed at a front surface of the front side housing 508 to fix the motor 500 to the rear frame (300 in FIG. 1). The fixing unit 550 is installed on the rear frame 300 while passing through a motor cover 535 that is coupled to close an open side of the motor housing 530. In detail, the fixing unit 550 includes a shaft 552 installed on the front side housing 508, and a mounter 554 bolted to the rear frame 300 while being installed on the shaft 552. If the motor 500 is fixed to the rear frame 300 through the fixing unit 550, the rear side housing 509 coupled to the front side housing 508 and the stator 506 installed on the inner circumferential surface of the rear side housing 509 are fixed while being restricted in rotation. Accordingly, if a power is applied to the coil, only the rotor 501 rotates.

The reduction gear unit has a planet gear assembly structure constituted of a plurality of gears. The reduction gear unit, as illustrated in the drawings, is constituted by including a first planet gear assembly 510 and a second planet gear assembly 520, so as to have a two-stage deceleration structure. However, the present invention is not limited thereto, and the reduction gear unit may be provided in a one-stage deceleration structure or a three-stage deceleration structure or above depending on a desired reduction gear ration.

The first planet gear assembly 510 serves to decelerate the rotary force of the rotor 501. As described above, the first planet gear assembly 510 is disposed in the accommodation space 503 of the rotor 501. In detail, the first planet gear assembly 510 includes a first sun gear 511 installed on the rotating shaft 504, a plurality of first planet gears 512 disposed around the first sun gear 511 while being engaged with the first sun gear 511, a first carrier 513 connected to a first center shaft 512a installed at a center of each of the plurality of first planet gears 512 to output the rotary force, and a first ring gear 514 fixed to the rear side housing 509 while being circumscribed on the periphery of the plurality of first planet gears 512.

In the case of the first planet gear assembly 510, as the first sun gear 511 coupled to the rotating shaft 504 is rotated by the rotary force of the rotor 501, the rotary force is transferred to the first planet gears 512. The first planet gears 512 revolve by the first ring gear 514 to which the outer circumferential surface of the first planet gears 512 are fixed. Accordingly, the first carrier 513 connected to the first center shaft 512a of each first planet gear 512 is rotated together with the revolution of the first planet gear 512 and thus outputs a decelerated rotary force.

The first carrier 513 is provided with a first flange portion 513a coupled to the first center shaft 512a, and a first shaft portion 513b formed at the center of the first flange portion 513a. In this case, the first shaft portion 513b is disposed collinear with the rotating shaft 504 so as to pass through the rear side housing 509, thereby protruding to the outside the motor 500. In addition, an end portion of the first shaft portion 513b is supported against the motor housing 530 so as to be rotated together with a second carrier 523, which is to be described later, by bearings 515 and 525.

The second planet gear assembly 520 includes a second sun gear 521 installed on the first shaft portion 513b, a plurality of second planet gears 522 disposed around the second sun gear 521 while being engaged with the second sun gear 521, a second carrier 523 connected to a second center shaft 522a installed at a center of each of the plurality of second planet gears 522, and a second ring gear 524 circumscribed on the periphery of the plurality of second planet gears 522. The second ring gear 524 is configured to output a rotary power that is decelerated by the second planet gear assembly 520.

The second planet gear assembly 520 is provided between the motor 500 and the motor housing 530. The second center shaft 522a installed at the center of each second planet gear 522 is inserted into a ball bearing 522b so as to be disposed in the center of the second planet gear 522. In addition, one side of the second center shaft 522a is coupled to the rear side housing 509, and the other side of the second center shaft 522a is coupled to the second carrier 523. The second planet gears 522 are rotated by the rotary force of the second sun gear 521.

The second ring gear 524 is coupled to the motor housing 530. That is, as illustrated in the drawings, the second ring gear 524 has a diameter corresponding to an inner diameter of the motor housing 530, is installed on the inner circumferential surface of the motor housing 530. A rib 524a is formed on at least one of two lateral sides of the ring gear 524. The two lateral sides of the second ring gear 524 represent a front side surface and a rear side surface of the second ring gear 524, respectively, with respect to a circumferential surface of the ring gear 524 of a ring shape. That is, the rib 524a may be integrally formed on the entire surface of one of the front side surface and the rear side surface of the second ring gear 524. Accordingly, the rigidity of the second ring gear 524 is improved. Since the rib 524a is formed on the second ring gear 524, the second ring gear 524 is prevented from being damage during the heat treatment process performed on the second ring gear 524. In addition, the second ring gear 524 is a portion that is installed on the motor housing 530 to output a decelerated rotary force, and the durability of the second ring gear 524 is improved in receiving and outputting the rotary force, thereby stably transferring the rotary force.

Meanwhile, a plurality of protrusions 524b are formed on the outer circumferential surface of the second gear 524, which has the rib 524a thereon, while being spaced apart from one another. The protrusion 524b secures the coupling state with respect to the motor housing 530 while preventing the second ring gear 524 from being deformed when the second ring gear 524 is installed on the motor housing 530. The motor housing 530 is provided with a coupling groove (not shown) matched to the protrusion 524b in shape at a position corresponding to the protrusion 524b, thereby facilitating the coupling between the motor housing 530 and the second ring gear 524.

In the case of the second planet gear assembly 520, a rotary force is transferred to the second planet gears 522 through the second sun gear 521 that is rotated together with the first shaft portion 513b, and thus the second planet gears 512 are rotated while being supported by the center shafts 522a of the second planet gears 522. Accordingly, the second ring gear 524 circumscribed on the second planet gears 522 is rotated together with the motor housing 530 through the rotation of the second planet gear 522, and thus a decelerated rotary force is output. Accordingly, the wheel (the rear wheel: 50) coupled to the motor housing 530 is rotated, thereby running the electric bicycle.

Meanwhile, the second carrier 523 is provided with a second flange portion 523a coupled to the second center shaft 522a, and a second shaft portion 523b formed at the center of the second flange portion 523a. In this case, the second shaft portion 523b is disposed collinear with the rotating shaft 504 and the first shaft portion 513b while being supported by the rear side housing 530. As described above, since the bearing 525 is installed on the second shaft portion 523b while being provided between the second shaft portion 523b and the motor housing 530, the second shaft portion 523b is not affected by the rotary force of the motor housing 530 that rotates together with the second ring gear 524.

In addition, the drive unit in accordance with the present disclosure is further provided with a one-way clutch 540 allowing a rotation in one direction. The one-way clutch 540 is provided between the first shaft portion 513b and the second sun gear 521. The one-way clutch 540 is a coupling member that allows a rotation only in one direction. If the first shaft portion 513b rotates in a direction that is allowed by the one-way clutch 540, the rotation of the first shaft portion 513*b* is transferred to the second sun gear 521 and thus the second sun gear 521 is rotated. The one-way clutch 540 is operated while rotating the wheel 50 through a rotary force generated according to the driving of the electric bicycle. If a rotary force of the wheel 50 is larger that a rotary force of the motor 500, that is, if a larger rotary force is generated beyond a rotary force transferred from the motor 500 at a downhill, the one-way clutch 540 prevents the rotary force of the wheel 50 from being transferred to the motor 500. Although the one-way clutch 540 is illustrated as being installed on the first carrier 513 that outputs a rotary force, which is decelerated by the first planet gear assembly 510, the present disclosure is not limited thereto. Alternatively, the one-way clutch 53 may be installed on the rotating shaft 504 serving as an input shaft to transfer a rotary force of the motor 500.

As describe above, the drive unit in accordance with the present disclosure has the first planet gear assembly 510 disposed at the inside the rotor 501, so that the motor 500 has a compact size when compared to the conventional motor. In addition, the rigidity of the second ring gear 524 is improved, so the coupling between the second ring gear 524 and the motor housing 530 is secured. Accordingly, the rotary force output from the second ring gear 524 is stably transferred, and the second ring gear 524 rotates together with the wheel 50 coupled to the motor housing 530. Accordingly, a power transmission unit to transfer a decelerated rotary force to the wheel is not required, and thus a simplified structure of the electric bicycle is provided.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A drive unit for an electric bicycle, the drive unit comprising:
    a motor configured to generate a rotary force to drive a wheel of the electric bicycle;
    a reduction gear unit provided with a plurality of gears to reduce a rotary force generated from the motor; and
    a ring gear configured to output the rotary force which is reduced by the reduction gear,
    wherein a rib, which is a portion of the ring gear, is bridging between inner teeth of the ring gear on at least one of two lateral sides of the ring gear and being integral with a surface of the at least one of two lateral sides of the ring gear.

2. The drive unit of claim 1, wherein the ring gear having the rib, which is being integral with the surface of the ring gear includes a plurality of protrusions protruding outward from an outer circumferential surface thereof while being spaced apart from each other.

3. The drive unit of claim 2, further comprising a motor housing installed on the wheel of the electric bicycle to accommodate the motor and the reduction gear unit, wherein the ring gear is installed on the motor housing.

4. The drive unit of claim 3, wherein the motor housing is provided with a coupling groove matched in shape to the protrusion such that the protrusion is coupled to the coupling groove.

5. The drive unit of claim 1, wherein the reduction gear unit comprises a first planet gear assembly and a second planet gear assembly, each of which has a sun gear rotated by receiving a rotary force, a plurality of planet gears disposed around the sun gear and engaged with the sun gear, a carrier connected to a center shaft of each of the plurality of planet gears, and the ring gear to surround the plurality of planet gears while being engaged with the plurality of planet gears, and
    wherein the first planet gear assembly and the second planet gear assembly are sequentially disposed such that a final output gear outputs the rotary force, which is reduced from the second planet gear assembly, through the ring gear.

6. The drive unit of claim 5, wherein the motor is provided with a rotor, which has an accommodation space formed at a center portion of the rotor axially, and a stator installed to surround the rotor while being spaced apart from the rotor by a predetermined interval, and
    wherein the first planet gear assembly is disposed in the accommodation space so as to be connected to the rotor, and the second planet gear assembly is disposed at an outside the motor.

* * * * *